US012542986B2

(12) United States Patent
Rao et al.

(10) Patent No.: US 12,542,986 B2
(45) Date of Patent: Feb. 3, 2026

(54) ELECTRONIC DEVICE

(71) Applicant: MERRY ELECTRONICS (SUZHOU) CO., LTD., Jiangsu Province (CN)

(72) Inventors: LiGuo Rao, Jiangsu Province (CN); YuanYuan Zhang, Jiangsu Province (CN); ChunLong Zheng, Jiangsu Province (CN)

(73) Assignee: MERRY ELECTRONICS (SUZHOU) CO., LTD., Suzhou (CN)

(*) Notice: Subject to any disclaimer, the term of this patent is extended or adjusted under 35 U.S.C. 154(b) by 163 days.

(21) Appl. No.: 18/630,823

(22) Filed: Apr. 9, 2024

(65) Prior Publication Data

US 2025/0063278 A1 Feb. 20, 2025

(30) Foreign Application Priority Data

Aug. 18, 2023 (CN) ........................ 202311048837.9

(51) Int. Cl.
*H04R 1/02* (2006.01)

(52) U.S. Cl.
CPC .................................... *H04R 1/02* (2013.01)

(58) Field of Classification Search
None
See application file for complete search history.

(56) References Cited

U.S. PATENT DOCUMENTS

| | | | | |
|---|---|---|---|---|
| 2024/0080628 A1* | 3/2024 | Mao | ........................ | H04R 9/066 |
| 2024/0089662 A1* | 3/2024 | Tang | ........................ | H04R 1/02 |
| 2024/0089663 A1* | 3/2024 | Tang | ........................ | H04R 9/025 |

FOREIGN PATENT DOCUMENTS

| | | | | |
|---|---|---|---|---|
| CN | 214901294 U | 11/2021 | | |
| CN | 218830621 U | 4/2023 | | |
| JP | 2019093336 A * | 6/2019 | ............. | H02K 33/16 |
| WO | WO 2022/135125 A1 | 6/2022 | | |

* cited by examiner

*Primary Examiner* — Walter F Briney, III
(74) *Attorney, Agent, or Firm* — Birch, Stewart, Kolasch & Birch, LLP

(57) ABSTRACT

An electronic device is disclosed. The housing has an accommodating groove; the magnetic component is disposed in the accommodating groove; the counterweight base is disposed on the magnetic component; the motor coil is disposed on the counterweight base and correspondingly disposed on the magnetic component; the supporting plate is disposed on the counterweight base; the first magnetic module is disposed on the supporting plate; the first magnetic module includes the first major magnetic component and the first minor magnetic component; the first major magnetic component has an accommodating perforation located above the motor coil; the second magnetic module is configured in the accommodating perforation. The bracket module is disposed on the housing and the first minor magnetic component; the vibration module is disposed on the bracket module, and the voice coil is disposed under the vibration module and passes through the bracket module.

13 Claims, 8 Drawing Sheets

ELECTRONIC DEVICE

CROSS REFERENCE TO RELATED APPLICATION

This application claims the priority benefit of Chinese Patent Application Serial Number 202311048837.9, filed on Aug. 18, 2023, the full disclosure of which is incorporated herein by reference.

BACKGROUND

Technical Field

The present application is related to a technical field of handheld or wearable electronic devices, and particularly, is related to an electronic device combining structures of a speaker and a motor.

Related Art

Currently, in internal components used in smartphones and smartwatches on a market, a speaker structure for audio playback and a motor structure for providing linear vibration are both independently designed. First, the speaker structure and the motor structure are processed and manufactured as individual components separately. Subsequently, the speaker structure and the motor structure are mounted inside an electronic device by reasonable configuration. However, the drawbacks of the aforementioned speaker structure and the aforementioned motor structure manufacture by the independent design is to have difficulty in how to utilize the reasonable configuration to effectively reduce the needed inner space of the electronic device occupied by the speaker structure and the motor structure, and it results in the limitation on the structural configuration of the inner space of the electronic device, thereby squeezing the space of the other components. As a result, how to effectively enhance the overall performance of the electronic device is the challenge.

SUMMARY

The embodiments of the present application provide an electronic device that addresses the issue of the needed inner space of the electronic device occupied by the speaker structure and the motor structure, which currently restricts the structural configuration of the inner space within electronic devices.

To solve the aforementioned issue, the present application is accomplished by the following steps.

An electronic device having a gravity center and including a housing, a magnetic component, a counterweight base, two motor coils, a supporting plate, a first magnetic module, a second magnetic module, a bracket module, a vibration module and a voice coil is provided. The housing has an accommodating groove. The magnetic component is disposed in the accommodating groove. The counterweight base is disposed on the magnetic component. The motor coil is disposed on the counterweight base and is correspondingly disposed on the magnetic component, wherein the magnetic component is configured to interact with the motor coil under the motor coil. The supporting plate is disposed on the counterweight base. The first magnetic module is disposed on the supporting plate, wherein the first magnetic module includes a first major magnetic component and a first minor magnetic component disposed at one side of the first major magnetic component, the first major magnetic component has an accommodating perforation located above the motor coil, and the first major magnetic component is configured to interact with the motor coil on one side above the motor coil. The second magnetic module is disposed in the accommodating perforation and configured to interact with the motor coil on the other side above the motor coil. The bracket module is disposed on the housing and located on the first minor magnetic component. The vibration module is disposed on the bracket module. The voice coil is disposed under the vibration module, passes through the bracket module and is disposed in the first major magnetic component and the first minor magnetic component.

In one embodiment, the second magnetic module includes a second major magnetic component and two second minor magnetic components, the two second minor magnetic components are located at two sides of the second major magnetic component, respectively, the second magnetic module corresponds to the motor coil and is disposed on the motor coil, the second major magnetic component is configured to interact with the motor coil on one side of the motor coil, and the two second minor magnetic components are configured to interact between the second major magnetic component and the first major magnetic component.

In one embodiment, each of the magnetic component, the first major magnetic component, the first minor magnetic component, the second major magnetic component and the second minor magnetic component has two surfaces with a first magnetic pole and a second magnetic pole, the second magnetic pole of the magnetic component is located below the motor coil, the second magnetic pole of the first major magnetic component is located at the one side above the motor coil, the first magnetic pole of the second major magnetic component is located at the other side above the motor coil, the first magnetic pole of the second minor magnetic component corresponds to the second major magnetic component, and the second magnetic pole of the second minor magnetic component corresponds to the first major magnetic component.

In one embodiment, the counterweight base further includes a first groove disposed on a bottom of the counterweight base and a second groove disposed on a top of the counterweight base, the magnetic component is disposed in the first groove, and the motor coil is disposed in the second groove.

In one embodiment, the counterweight base further has a fixed block disposed in the second groove, and the motor coil encircles the fixed block.

In one embodiment, the bracket module includes a bracket component and a minor magnetic conductive component, the bracket component is disposed in the housing, the minor magnetic conductive component has a body, an outer fixing part and an inner fixing part, the body has a first opening, the outer fixing part is disposed on an outer side of the body and is fixed on an inner side of the bracket component, the bracket component has a fixing through hole, one end of the outer fixing part of the minor magnetic conductive component passes through the fixing through hole, the inner fixing part is disposed at an inner side of the body and is located inside the first opening, and the inner fixing part is fixed above the first minor magnetic component.

In one embodiment, the housing has a fixing notch, the fixing notch is located on a top of a sidewall of the housing, and one end of the outer fixing part is fixed on the fixing notch of the housing.

In one embodiment, the body of the minor magnetic conductive component has a vent located around the first opening, and the vent is connected to the first opening.

In one embodiment, a major magnetic conductive component is further included and disposed on the first major magnetic component and the second magnetic module.

In one embodiment, the supporting plate has a major body part and a plurality of connecting parts disposed on a peripheral side of the major body part, and the plurality of connecting parts are fixed on an inner wall of the housing, respectively, and the major body part has a second opening corresponding to the motor coil and located above the motor coil.

In one embodiment, the vibration module includes a diaphragm and a middle adhesive sheet, the bracket module is disposed on a peripheral side of the diaphragm, and the diaphragm is disposed on a peripheral side of the middle adhesive sheet, the voice coil is disposed under the middle adhesive sheet and is located inside the diaphragm.

In one embodiment, two elastic modules are further included and disposed on two sides of the counterweight base, and two ends of each of the two elastic components contact the housing and the counterweight base.

In one embodiment, each elastic module includes an elastic component and a damping sheet, two ends of the elastic component contact the housing and the counterweight base, and the damping sheet is disposed between the two ends of the elastic component.

The present application provides an electronic device that employs a structural design in which the voice coil and the motor coil share the first magnetic module and the second magnetic module to effectively reduce the needed inner space of the electronic device occupied by the combination of the speaker structure and the motor structure, thereby increasing the available space for the other components. The available space may be used to enhance the design of the structures of the other components to improve the efficiency of the electronic device. Alternatively, the structural design in which the voice coil and the motor coil share the first magnetic module and the second magnetic module may directly reduce the overall volume of the electronic device, and it is more convenient for storage. The second magnetic module is mounted on the interior of the first magnetic module, so that the first magnetic module and the second magnetic module can enhance the magnetic field intensity interacting with the motor coil and the voice coil so that the motor coil and the voice coil can reach better effect.

BRIEF DESCRIPTION OF THE DRAWINGS

The accompanying drawings herein are provided to have a further understanding on the present application and constitutes a part of the present application. The schematic embodiments and the description of the present application is used to explain the present application instead of constituting inappropriate limitation. In the drawings.

Figure 1:
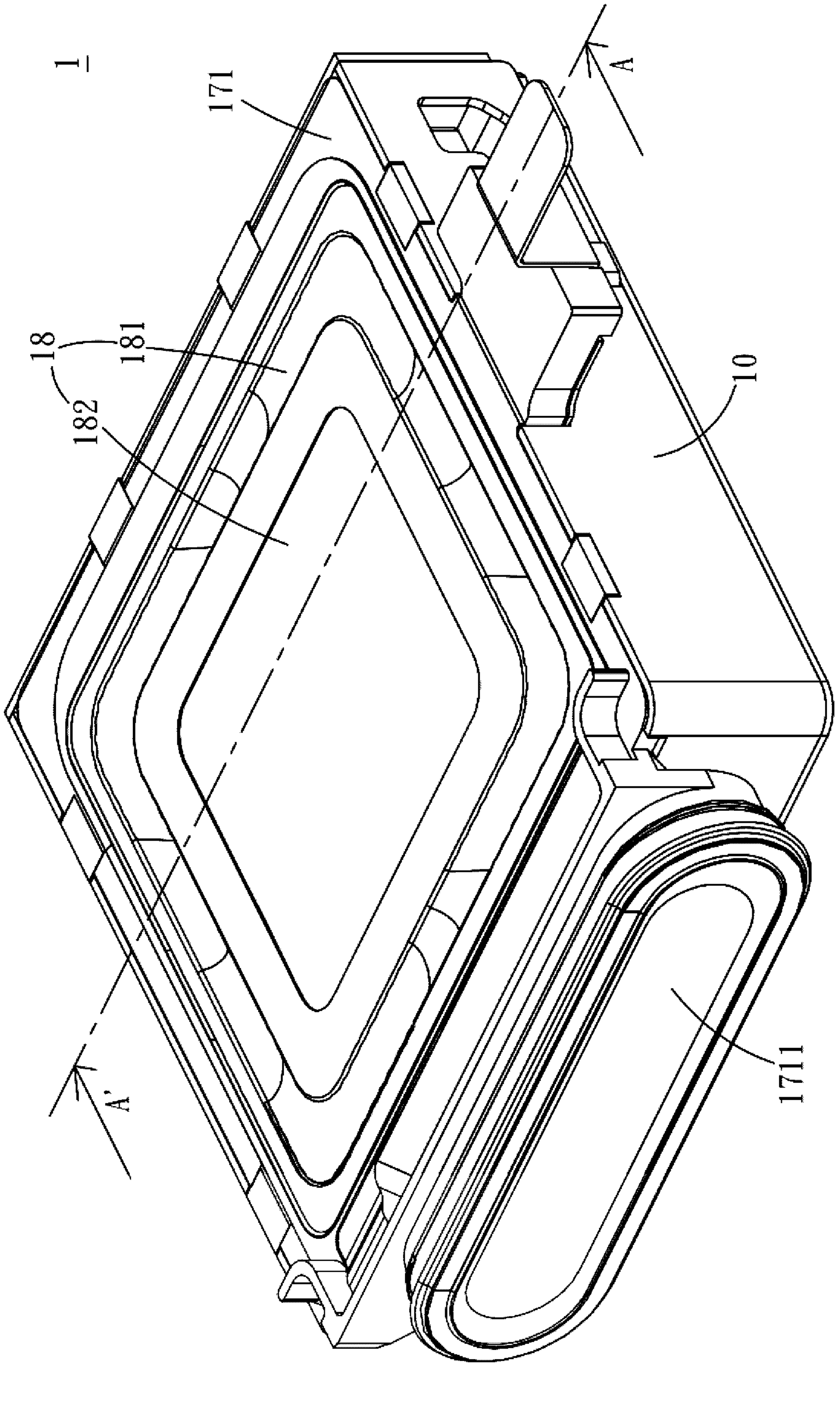
FIG. 1 is a 3D view of the electronic device of the present application.

Considering the accompanying diagrams, the explanations are as follows: 1: electronic device; 10: housing; 101: accommodating groove; 102: fixing hole; 103: fixing notch; 11: magnetic component; 12: counterweight base; 121: first groove; 122: second groove; 123: fixed block; 124: groove 13: motor coil; 14: supporting plate; 141: major body part; 1410: second opening; 142: connecting part; 15: first magnetic module; 151: first major magnetic component; 1510: accommodating perforation; 152: first minor magnetic component; 16: second magnetic module; 161: second major magnetic component; 162: second minor magnetic component; 17: bracket module; 171: bracket component; 1711: voice outlet; 1712: fixing through hole; 172: minor magnetic conductive component; 1721: body; 1722: outer fixing part; 1723: inner fixing part; 1724: first opening; 1725: vent; 18: vibration module; 181: diaphragm; 182: middle adhesive sheet; 19: voice coil; 21: elastic component; 211: elastic component; 212: damping sheet; 22: major magnetic conductive component; 24: electrical module; 241: electrical bracket; 242: first electrical part; 243: second electrical part; 244: third electrical part.

DETAILED DESCRIPTION OF THE EMBODIMENTS

The multiple embodiments of the present application are disclosed by the drawings as follows, and for precise explanation, the implementing details of the present application will be described together with the multiple embodiments of the present application in the following paragraphs. However, it should be understood that the implementing details of the present application should not be construed as the restrictions of the present application. In other words, in some of the embodiments of the present application, the implement details of the present application are not essential. Besides, for simplifying the drawings, some well-known structures and modules are schematically shown to simplify the drawings. In the following embodiments, the same reference numerals in different drawings represent the same or similar modules.

Figure 2:
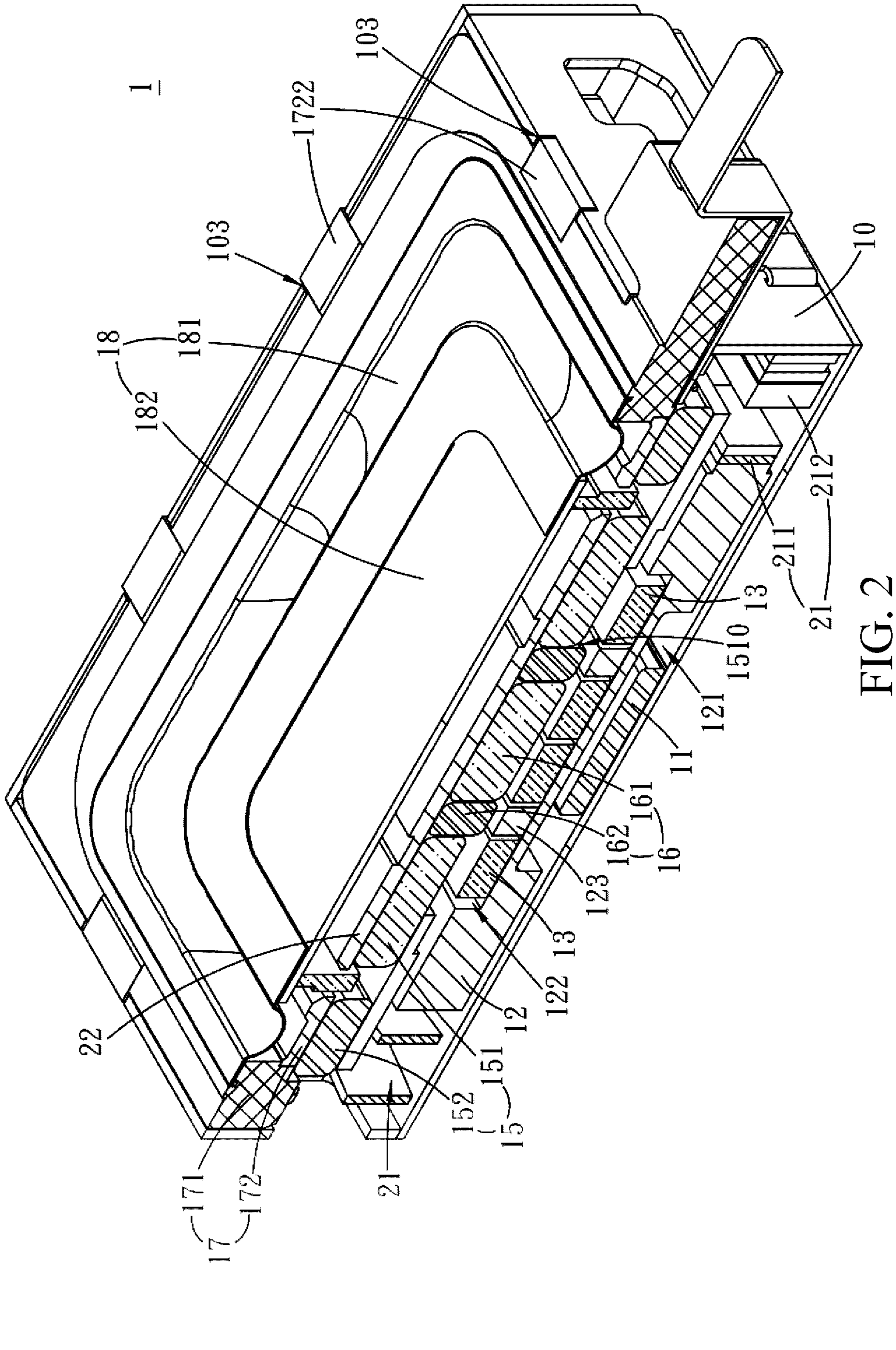
FIG. 2 is a cross-sectional 3D view sectioned from line A-A' of FIG. 1.
Figure 3:
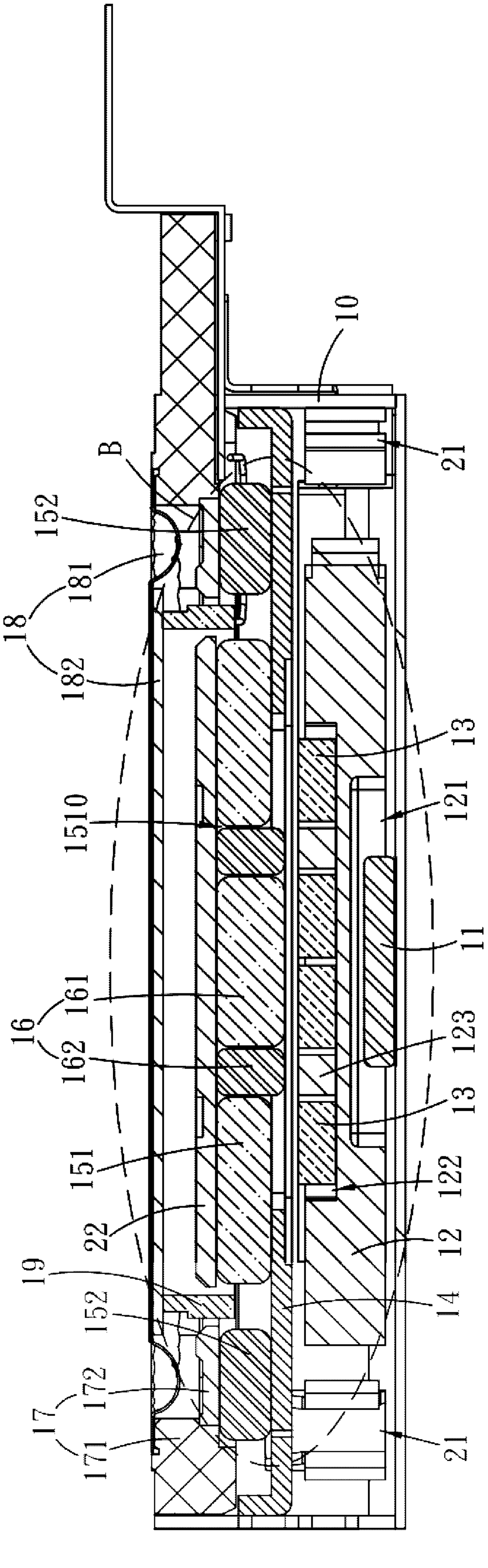
FIG. 3 is a sectional view sectioned from line A-A' of FIG. 1.
Figure 4:
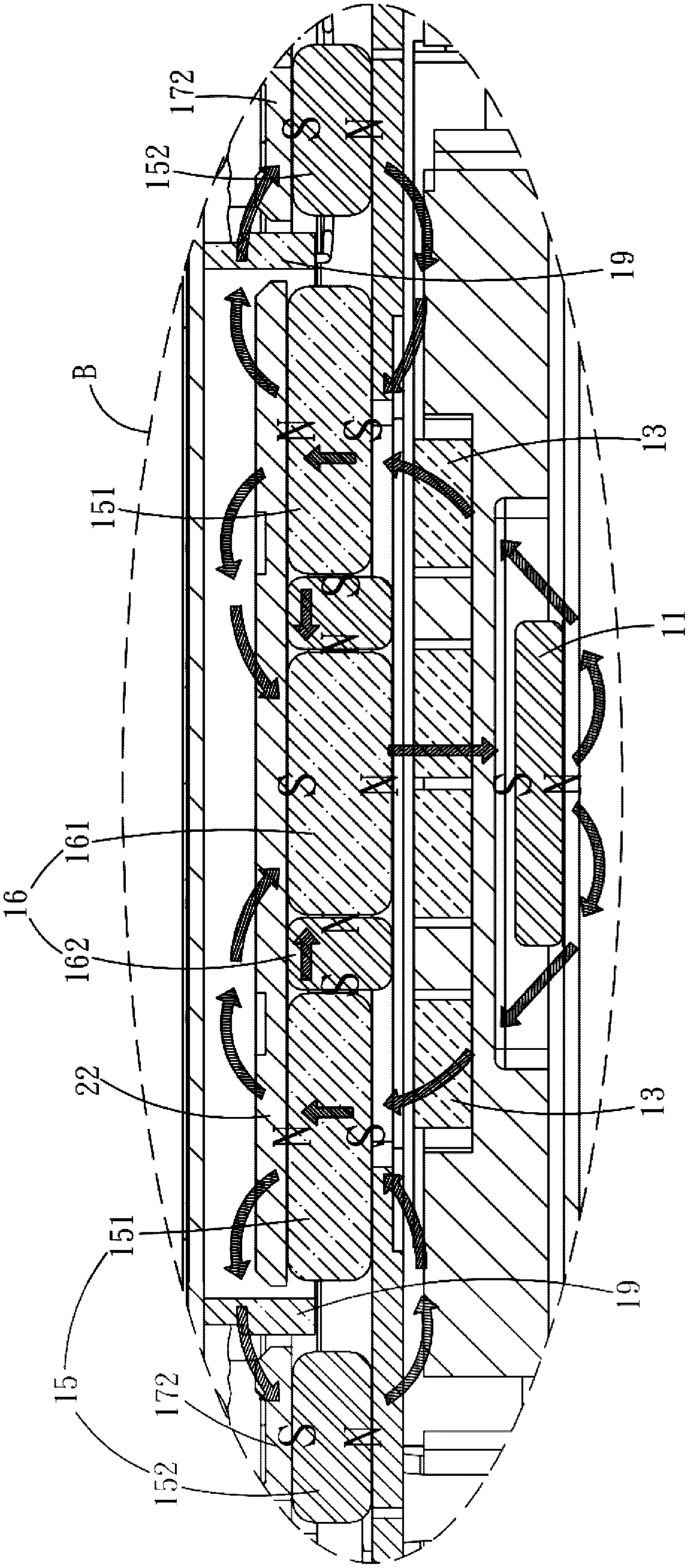
FIG. 4 is an enlarged view of region B in FIG. 3.

Please refer to FIGS. 1 to 4. FIG. 1 is a 3D view of the electronic device of the present application, FIG. 2 is a cross-sectional 3D view sectioned from line A-A' of FIG. 1, FIG. 3 is a sectional view sectioned from line A-A' of FIG. 1, and FIG. 4 is an enlarged view of the region B in FIG. 3. As shown in the figures, the present application provides an electronic device 1, and the electronic device 1 includes a housing 10, a magnetic component 11, a counterweight base 12, a motor coil 13, a supporting plate 14, a first magnetic module 15, a second magnetic module 16, a bracket module 17, a vibration assembly 18, and a voice coil 19. The housing 10 has an accommodating groove 101. The magnetic component 11 is disposed in the accommodating groove 101. The counterweight base 12 is disposed on the magnetic component 11. The motor coil 13 is disposed on the counterweight base 12, the motor coil 13 is disposed correspondingly to the magnetic component 11, and the magnetic component 11 is configured to interact with the motor coil 13 and under the motor coil 13. The supporting plate 14 is disposed on the counterweight base 12. The first magnetic module 15 is disposed on the supporting plate 14. The first magnetic module 15 includes a first major magnetic component 151 and a first minor magnetic component 152 disposed at one side of the first major magnetic component 151, the first major magnetic component 151 has an accommodating perforation 1510 located above the motor coil 13, and the first major magnetic component 151 is configured to interact with the motor coil 13 on one side above the motor coil 13. The second magnetic module 16 is disposed in the accommodating perforation 1510, and is configured to interact with the motor coil 13 on the other side above the motor coil 13. The bracket module 17 is disposed on the housing 10, and the bracket module 17 is located on the first minor magnetic component 152. The vibration module 18 is disposed on the bracket module 17. The voice coil 19 is disposed under the vibration module 18 and passes through the bracket module 17 and is disposed in the first major magnetic component 151 and the first minor magnetic component 152.

As mentioned above, the second magnetic module 16 includes a second major magnetic component 161 and a second minor magnetic component 162 located at one side of the second major magnetic component 161, the second magnetic module 16 corresponds to the motor coil 13 and is disposed on the motor coil 13, the second major magnetic component 161 is configured to interact with the motor coil 13 on one side of the motor coil 13, and the second minor magnetic component 162 is configured to interact between the second major magnetic component 161 and the first major magnetic component 151.

Please refer to FIG. 4 again. Each of the magnetic component 11, the first major magnetic component 151, the first minor magnetic component 152, the second major magnetic component 161 and the second minor magnetic component 162 has two surfaces with a first magnetic pole N and a second magnetic pole S. The second magnetic pole S of the magnetic component 11 is located below the motor coil 13, the second magnetic pole S of the first major magnetic component 151 is located on one side above the motor coil 13, the first magnetic pole N of the second major magnetic component 161 is located on the other side above the motor coil 13, the first magnetic pole N of the second minor magnetic component 162 corresponds to the second major magnetic component 161, and the second magnetic pole S of the second minor magnetic component 162 corresponds to the first major magnetic component 151. The above magnetic pole of the south pole or the north pole may be adjusted according to the user requirements.

Figure 5:
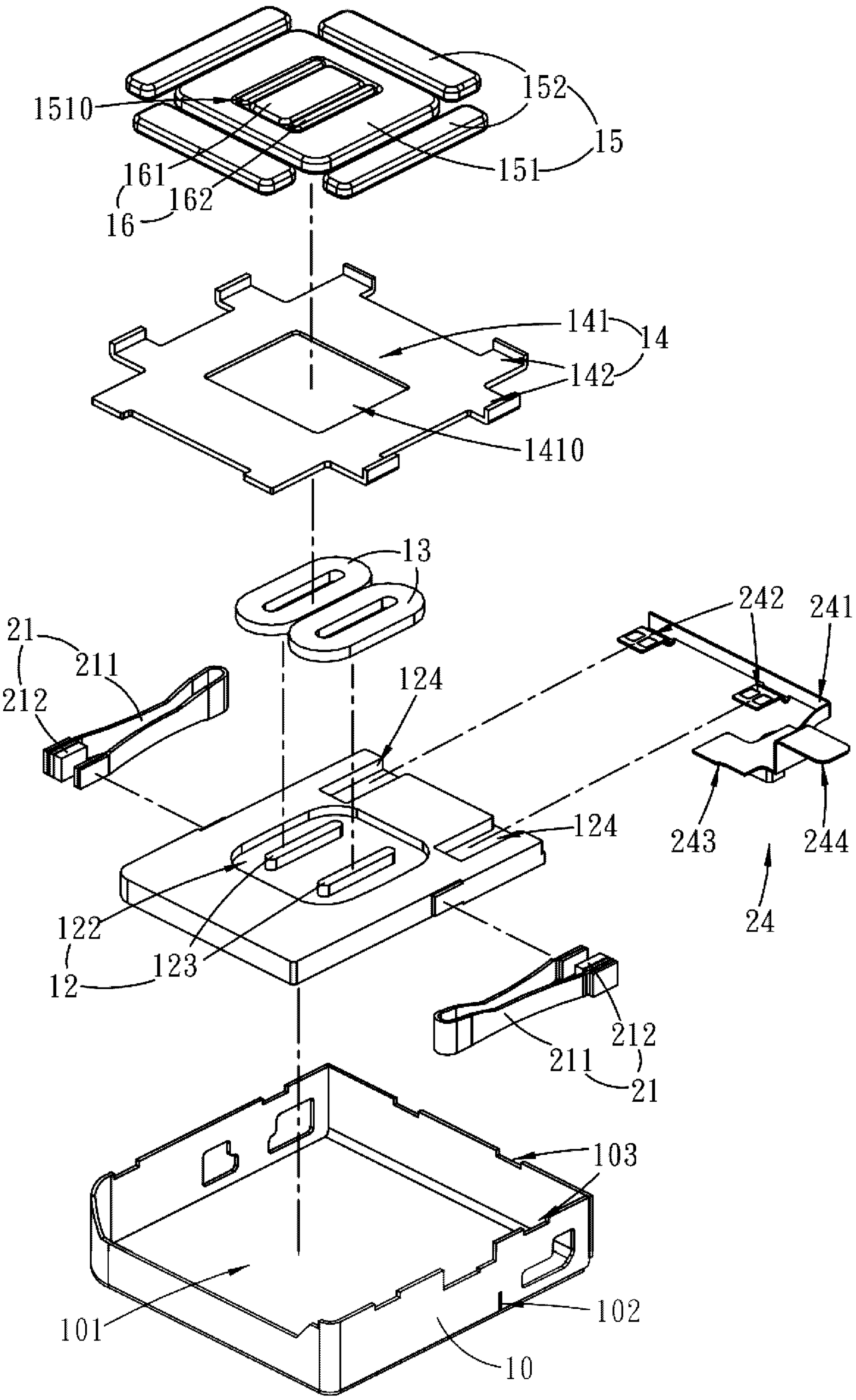
FIG. 5 is an exploded view of the lower part of the electronic device of the present application.
Figure 6:
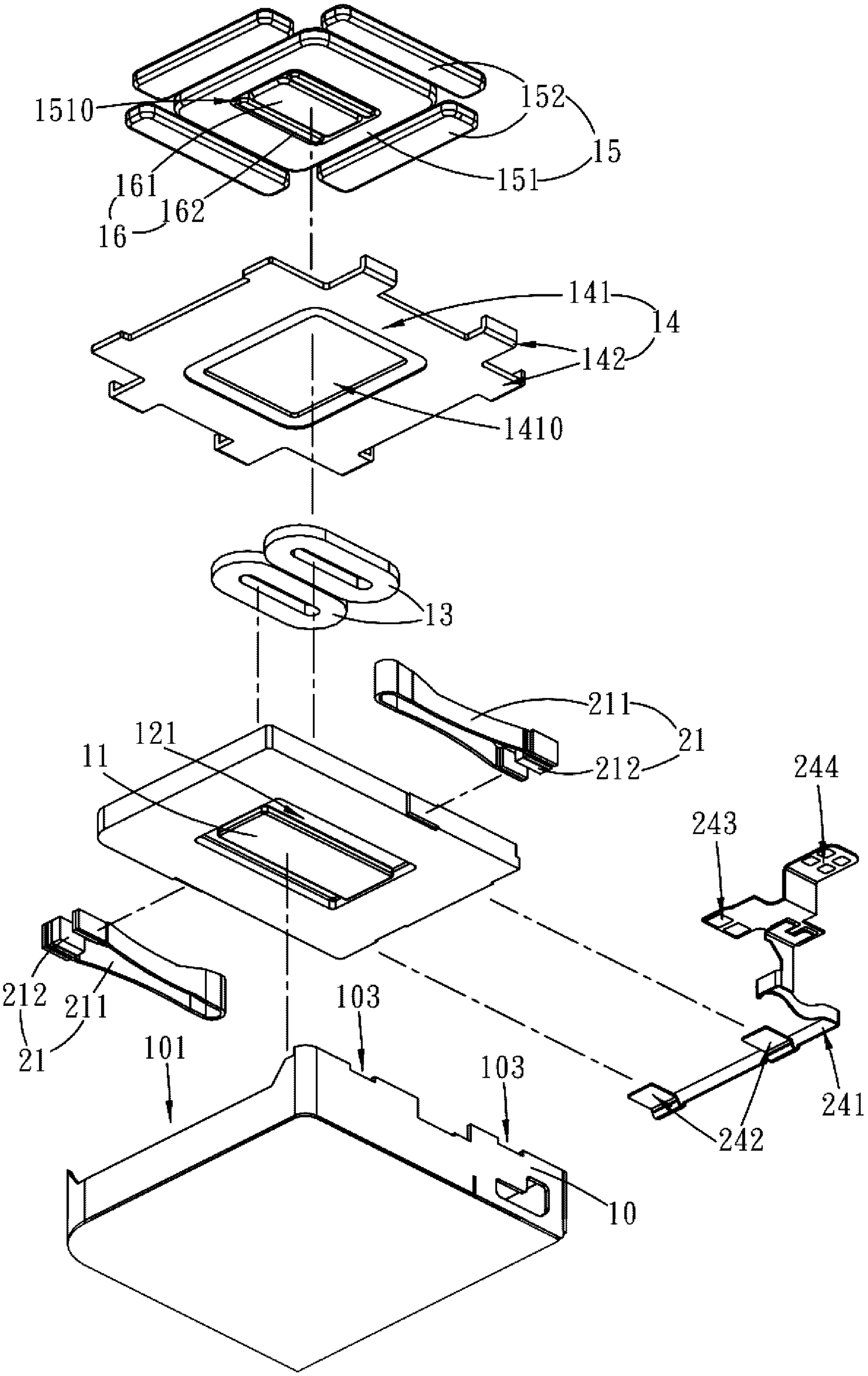
FIG. 6 is an exploded view of another lower part of the electronic device of the present application.

Please refer to FIGS. 5 and 6, FIG. 5 is an exploded view of the lower part of the electronic device of the present application, and FIG. 6 is an exploded view of another lower part of the electronic device of the present application. As shown in the figures, in the present embodiment, the counterweight base 12 further includes a first groove 121 and a second groove 122. The first groove 121 is located on the bottom of the counterweight base 12, the magnetic component 11 is located inside the first groove 121, the second groove 122 is located on the top of the counterweight base 12, and the motor coil 13 is located inside the second groove 122. The position of the first groove 121 corresponds to that of the second groove 122. The number of the second groove 122 corresponds to the motor coil 13. The motor coil 13 is a winding coil structure that is flat and approximately elliptical in structure. The contour of the second groove 122 corresponds to that of the motor coil 13. The counterweight base 12 further includes a fixed block 123 disposed in the second groove 122. The motor coil 13 encircles the fixed block 123, and the motor coil 13 is fixed on the counterweight base 12 by adhesives so that the motor coil 13 is fixed in the second groove 122.

As mentioned above, the number of the motor coils 13 is two, and the two motor coils 13 are disposed on the counterweight base 12, and the two motor coils 13 are disposed correspondingly to the magnetic component 11. The magnetic component 11 is configured to interact with the two motor coils 13 below the two motor coils 13. In addition, the first magnetic module 15 is disposed on the supporting plate 14, and the first magnetic module 15 includes a first major magnetic component 151 and a plurality of first minor magnetic components 152. The plurality of first minor magnetic component 152 are disposed on the peripheral side of the first major magnetic component 151, the first major magnetic component 151 has an accommodating perforation 1510 disposed above the two motor coils 13, and the first major magnetic component 151 is configured to interact with two motor coils 13 on the outer side above the two motor coils 13. In addition, the second magnetic module 16 includes a second major magnetic component 161 and two second minor magnetic components 162. The two second minor magnetic components 162 are disposed on the two sides of the second major magnetic component 161, i.e., the second minor magnetic component 162 is positioned between the second major magnetic component 161 and the first major magnetic component 151. The second magnetic module 16 corresponds to the two motor coils 13 and is disposed above the two motor coils 13, the second major magnetic component 161 is configured to interact with the two motor coils 13 on the inner side above the two motor coils 13, and the second minor magnetic component 162 is configured to interact between the second major magnetic component 161 and the first major magnetic component 151.

Furthermore, the supporting plate 14 has a major body part 141 and a plurality of connecting part 142. The plurality of connecting part 142 is disposed on the peripheral side of the major body part 141, and the plurality of connecting part 142 are fixed on the inner wall of the housing 10. The major body part 141 has a second opening 1410. The second opening 1410 corresponds to the two motor coils 13 and is located above the two motor coils 13, the width of the second opening 1410 is less than the major axis length of each of the motor coils 13, and the supporting plate 14 may be fixed on the motor coils 13 and is pressed against the motor coils 13. The first magnetic module 15 is disposed on the major body part 141 of the supporting plate 14, the first major magnetic component 151 is disposed on the peripheral side of the second opening 1410 of the major body part 141, the accommodating perforation 1510 of the first major magnetic component 151 corresponds to the second opening 1410 of the major body part 141, and the accommodating perforation 1510 and the second opening 1410 are connected to each other. Furthermore, the second magnetic module 16 is fixed in the accommodating perforation 1510, there is no obstruction of the supporting plate 14 between the second magnetic module 16 and the motor coils 13, and thus, it is beneficial for the second major magnetic component 161 to interact with the motor coils 13 on the inner side above the two motor coils 13.

Additionally, the materials of the counterweight base 12 include tungsten steel or heavier material, etc. When the motor coils 13 interact with the magnetic field formed by the magnetic component 11, the first magnetic module 15 and the second magnetic module 16, the motor coils 13 will drive the counterweight base 12 to vibrate vertically or shift laterally, and the weight of the counterweight base 12 is used to stabilize the operational state of the electronic device 1. Furthermore, the electronic device 1 further includes two elastic modules 21 disposed on both sides of the counterweight base 12. The two ends of each of the two elastic modules 21 respectively contact the inner wall of the housing 10 and the counterweight base 12 so that the counterweight base 12 is maintained in the center of the accommodating groove 101 of the housing 10 due to the mutual withstanding of the two elastic modules 21 on both sides.

In this embodiment, the structure of each elastic module 21 is a V-shaped or U-shaped bent structure, and the materials of each elastic module 21 include bendable metal materials. When the elastic module 21 on one side of the counterweight base 13 undergoes vibrations and compression and the two ends of the elastic module 21 on one side of the counterweight base 13 approach each other due to the compression, the elastic module 21 on one side of the counterweight base 13 generates a reactive elastic restoring force due to the compression, and thus, the counterweight base 13 is pushed at the center position of the accommodation groove 101. At the same time, the two ends of the elastic module 21 on the other side of the counterweight base 13 undergo a pull force to be separate from each other so that the elastic module 21 on the other side of the counterweight base 13 generates a reactive elastic restoring force due to tension, and thus, the counterweight base 13 is pushed at the center position of the accommodation groove 101. In this embodiment, in addition to maintaining the center of gravity by the counterweight of the counterweight base 12, the action force of the two elastic modules 21 serves as a buffer for the displacement caused by the vibration of the counterweight base 12. Each elastic module 21 includes an elastic component 211 and a damping sheet 212, the two ends of the elastic component 211 contact the housing 10 and the counterweight base 12, and the damping sheet 212 is disposed between the two ends of the elastic component 211. When the two ends of the elastic module 21 undergoes the compression to approach to each other, the damping sheet 212 undergoes the compression from the two ends of the elastic module 21, thereby assisting in buffering the impact caused by the approaching of the two ends of the elastic module 21.

Figure 7:
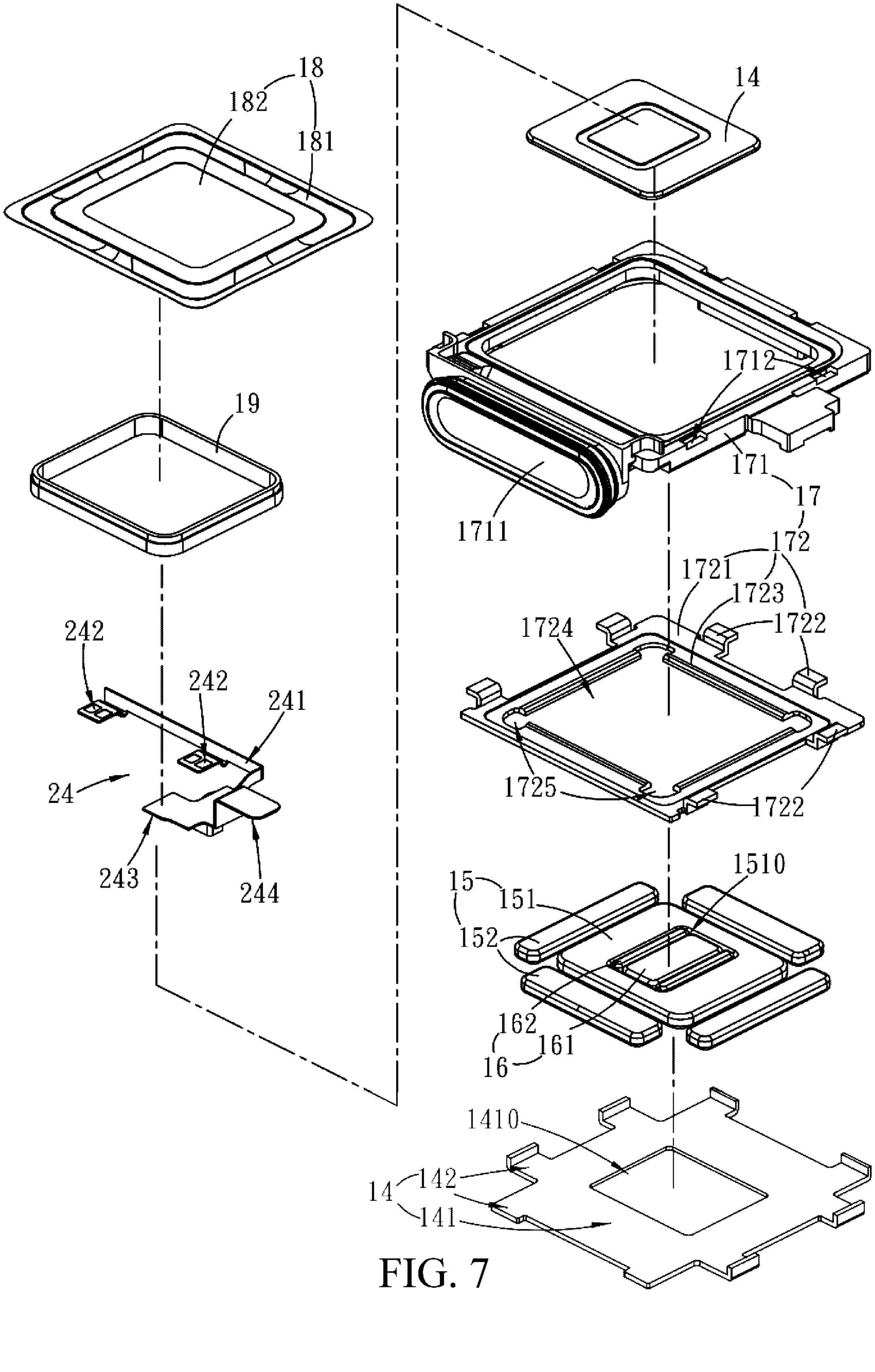
FIG. 7 is an exploded view of the upper part of the electronic device of the present application.
Figure 8:
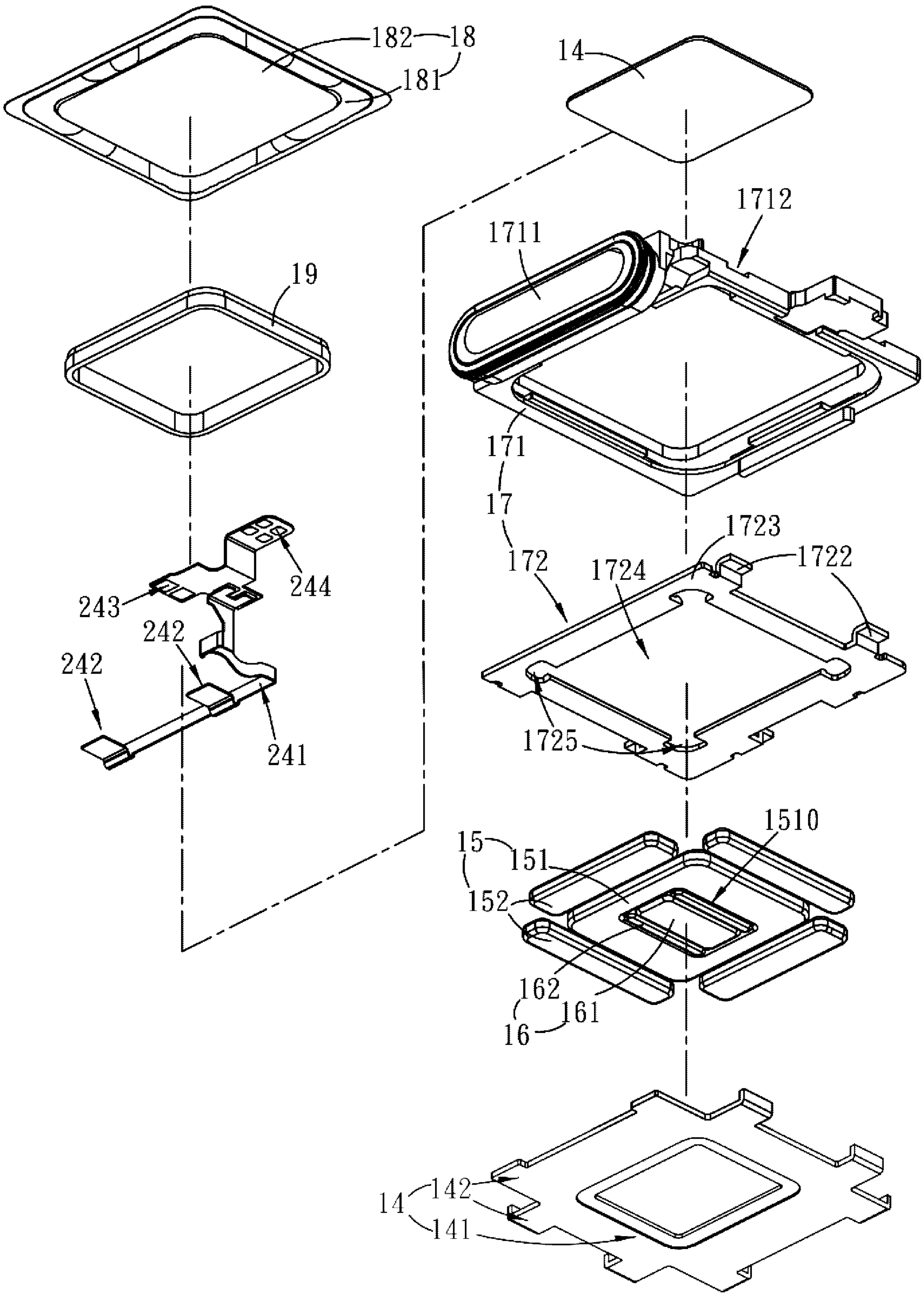
FIG. 8 is an exploded view of another upper part of the electronic device of the present application.

Please refer to FIG. 7 and FIG. 8, in which FIG. 7 is an exploded view of the upper part of the electronic device of the present application and FIG. 8 is an exploded view of another upper part of the electronic device. As shown in the figures, in this embodiment, the bracket module 17 includes a bracket component 171 and a minor magnetic conductive component 172. The bracket component 171 is disposed in the housing 10 and has an audio outlet 1711 connected to the accommodating groove 101, the voice coil 19 drives the vibration module 18 to vibrate within the accommodating groove 101 to transmit audio signals outward from the audio outlet 1711. Additionally, the minor magnetic conductive component 172 has a body 1721, an outer fixing part 1722 and an inner fixing part 1723. The body 1721 has a first opening 1724, the outer fixing part 1722 is disposed on the outer side of the body 1721, the bracket component 171 has a fixing through hole 1712 passing through from the inner side of the bracket component 171 to the outer side of the bracket component 171. One end of the outer fixing part 1722 of the minor magnetic conductive component 172 passes through the fixing through hole 1712 so that the minor magnetic conductive component 172 is fixed on the inner side of the bracket component 171.

Additionally, the housing 10 has a fixing notch 103, the fixing notch 103 is located on the top of the sidewall of the housing, the bracket module 17 is disposed on the side wall of the 10, and one end of the outer fixing part 1722 of the minor magnetic conductive component 172 of the bracket module 17 is fixed on the fixing notch 103 of the housing 10. The inner fixing part 1723 is disposed on the inner side of the body 1721 and is located inside the first opening 1724, the inner fixing part 1723 of the body 1721 is fixed above the first minor magnetic component 152 so that the inner fixing part 1723 of the minor magnetic conductive component 172 is configured to interact with the plurality of first minor magnetic components 152.

In this embodiment, the electronic device 1 further includes a major magnetic conductive component 22 disposed on the first major magnetic component 151 of the first magnetic module 15 and disposed on the second magnetic module 16. Moreover, the body 1721 of the minor magnetic conductive component 172 has a vent 1725 located around the first opening 1724, and the vent 1725 is connected to the first opening 1724. Thus, the vent 1725 aids in the circulation of air within the accommodating groove 101 to enhance the resonance sound effects of the voice coil 19 and the vibration module 18 inside the accommodating groove 101. In addition, the vibration module 18 includes a diaphragm 181 and a middle adhesive sheet 182. The bracket module 17 is disposed on the peripheral side of the diaphragm 181, and the diaphragm 181 is disposed on the peripheral side of the middle adhesive sheet 182. The voice coil 19 is disposed below the middle adhesive sheet 182 and the voice coil 19 is located on the inner side of the diaphragm 181.

In this embodiment, the electronic device 1 further includes an electrical module 24. The electrical module 24 is disposed in the housing 10 and passes through the fixing hole 102 of the housing 10 for fixation, the fixing hole 102 is connected to the accommodating groove 101, and the electrical module 24 is electrically connected to the motor coil 13 and the voice coil 19. The electrical module 24 includes an electrical bracket 241, a first electrical part 242, a second electrical part 243 and a third electrical part 244. The first end of the electrical bracket 241 has the first electrical part 242, the second end of the electrical bracket 241 has the second electrical part 243, and the third end of the electrical bracket 241 has the third electrical part 244. The electrical bracket 241 is mounted on the housing 10, the first end of the electrical bracket 241 is located in the accommodating groove 101 of the housing 10, the first electrical part 242 is disposed on the counterweight base 12, the first electrical part 242 is electrically connected to the motor coils 13. The counterweight base 12 further includes a groove 124, and the first electrical part 242 is disposed inside the groove 124. The second end of the electrical bracket 241 is disposed on the inner side the bracket module 17, and the second electrical part 243 is connected to the voice coil 19. The third end of the electrical bracket 241 is disposed on the outer side of the bracket module 17, and the third electrical part 244 is electrically connected to external power supplies.

Furthermore, the supporting plate 14 is disposed on the counterweight base 12, the supporting plate 14 is used to not only fix the motor coils 13, but also fix the first electrical part 242 of the electrical module 24 so as to reinforce the fixation of the electrical module 24. The electrical bracket 241 in this embodiment may be assembled by a plurality of bracket components to facilitate the fixation of the electrical bracket 241 and the housing 10 according to the user requirements. The electrical connection between the first electrical part 242 and the motor coils 13, and the electrical connection between the second electrical part 243 and the voice coil 19 may be further implemented through electrical connection lines (not shown in figures).

Please refer to FIG. 3 to FIG. 6 again. In the operational process of the electronic device 1 in the present embodiment, the electronic device 1 introduces power to the two motor coils 13 via the first electrical part 242 of the electrical module 24 to change the magnetic field of the two motor coils 13. The two motor coils 13 generate relative attraction and repulsion interaction on the magnetic field of the magnetic component 11, the first major magnetic component 151 of the first magnetic module 15 and the second magnetic module 16 so that the motor coils 13 generate left and right linear displacement in a transverse direction relative to the counterweight base 12 and it causes the electronic device 1 to be in a vibration state. The inner side under the two motor coils 13 corresponds to the second magnetic pole S of the magnetic component 11, and the outer side above the two motor coils 13 corresponds to the second magnetic pole S of the first major magnetic component 151, and the inner side above the two motor coils 13 corresponds to the first magnetic pole N of the second major magnetic component 161. The first magnetic poles N and the second magnetic poles S of the two second minor magnetic components 162 are disposed in the transverse direction, the first magnetic poles N of the two second minor magnetic components 162 face toward the inner side to correspond to the second major magnetic component 161, and the second magnetic poles S of the two second minor magnetic components 162 face toward the outer side to correspond to the first major magnetic component 151. The first magnetic module 15 and the second magnetic module 16 in this embodiment raise the magnetic field intensity through the above arrangement. Furthermore, the first major magnetic component 151 of the first magnetic module 15 and the second magnetic module 16 further concentrate the magnetic lines of the magnetic field through the assistance of the major magnetic conductive component 22, and it is beneficial to improve the interaction of the two motor coils 13. The two elastic modules 21 serve as the buffer structure for the vibrations of the counterweight base 12 driven by the two motor coils 13.

As the above mentioned, the electronic device 1 introduces power to the voice coil 19 via the second electrical part 243 of the electrical module 24 to change the magnetic field of the voice coil 19. The voice coil 19 generates the relative attraction and repulsion interaction on the magnetic field of the first major magnetic component 151 and the first minor magnetic component 152 of the first magnetic module 15 so that the voice coil 19 has mechanical linkage on the vibration module 18 to generate up and down linear displacement, and the diaphragm 181 and the middle adhesive sheet 182 of the vibration module 18 are in the vibration state, Hence, the vibration module 18 generates resonance effect in the accommodating groove 101, and thus the vibration module 18 generates audio signals and the audio signals are transmitted by the audio outlet 1711 on bracket component 171 of the bracket module 17.

In summary, the present application provides an electronic device that employs a structural design in which the voice coil and the motor coil share the first magnetic module and the second magnetic module to effectively reduce the needed inner space of the electronic device occupied by the combination of the speaker structure and the motor structure, thereby increasing the available space for the other components. The available space may be used to enhance the design of the structures of the other components to improve the efficiency of the electronic device. Alternatively, the structural design in which the voice coil and the motor coil share the first magnetic module and the second magnetic module may directly reduce the overall volume of the electronic device, and it is more convenient for storage. The second magnetic module is mounted on the interior of the first magnetic module, so that the first magnetic module and the second magnetic module can enhance the magnetic field intensity interacting with the motor coil and the voice coil so that the motor coil and the voice coil can reach better effect.

It is to be understood that the term "comprises", "comprising", or any other variants thereof, is intended to encompass a non-exclusive inclusion, such that a process, method, article, or device of a series of elements not only include those elements but also comprises other elements that are not explicitly listed, or elements that are inherent to such a process, method, article, or device. An element defined by the phrase "comprising a . . . " does not exclude the presence of the same element in the process, method, article, or device that comprises the element.

Although the present invention has been explained in relation to its preferred embodiment, it does not intend to limit the present invention. It will be apparent to those skilled in the art having regard to this present invention that other modifications of the exemplary embodiments beyond those embodiments specifically described here may be made without departing from the spirit of the invention. Accordingly, such modifications are considered within the scope of the invention as limited solely by the appended claims.

What is claimed is:

1. An electronic device having a gravity center, comprising:

a housing having an accommodating groove;

a magnetic component disposed in the accommodating groove;

a counterweight base disposed on the magnetic component;

a motor coil disposed on the counterweight base and correspondingly disposed to the magnetic component, wherein the magnetic component is configured to interact with the motor coil under the motor coil;

a supporting plate disposed on the counterweight base;

a first magnetic module disposed on the supporting plate, wherein the first magnetic module comprises a first major magnetic component and a first minor magnetic component disposed at one side of the first major magnetic component, the first major magnetic component has an accommodating perforation located above the motor coil, and the first major magnetic component is configured to interact with the motor coil on one side above the motor coil;

a second magnetic module disposed in the accommodating perforation and configured to interact with the motor coil on the other side above the motor coil;

a bracket module disposed on the housing and located on the first minor magnetic component;

a vibration module disposed on the bracket module; and a voice coil disposed under the vibration module, passing through the bracket module and disposed in the first major magnetic component and the first minor magnetic component.

2. The electronic device as claimed in claim 1, wherein the second magnetic module comprises a second major magnetic component and two second minor magnetic components, the two second minor magnetic components are located at two sides of the second major magnetic component, respectively, the second magnetic module corresponds to the motor coil and is disposed on the motor coil, the second major magnetic component is configured to interact with the motor coil on one side of the motor coil, and the two second minor magnetic components are configured to interact between the second major magnetic component and the first major magnetic component.

3. The electronic device as claimed in claim 2, wherein each of the magnetic component, the first major magnetic component, the first minor magnetic component, the second major magnetic component and the second minor magnetic component has two surfaces with a first magnetic pole and a second magnetic pole, the second magnetic pole of the magnetic component is located below the motor coil, the second magnetic pole of the first major magnetic component is located at the one side above the motor coil, the first magnetic pole of the second major magnetic component is located at the other side above the motor coil, the first magnetic pole of the second minor magnetic component corresponds to the second major magnetic component, and the second magnetic pole of the second minor magnetic component corresponds to the first major magnetic component.

4. The electronic device as claimed in claim 1, wherein the counterweight base further comprises a first groove disposed on a bottom of the counterweight base and a second groove disposed on a top of the counterweight base, the magnetic component is disposed in the first groove, and the motor coil is disposed in the second groove.

5. The electronic device as claimed in claim 4, wherein the counterweight base further has a fixed block disposed in the second groove, and the motor coil encircles the fixed block.

6. The electronic device as claimed in claim 1, wherein the bracket module comprises a bracket component and a minor magnetic conductive component, the bracket component is disposed in the housing, the minor magnetic conductive component has a body, an outer fixing part and an inner fixing part, the body has a first opening, the outer fixing part is disposed on an outer side of the body and is fixed on an inner side of the bracket component, the bracket component has a fixing through hole, one end of the outer fixing part of the minor magnetic conductive component passes through the fixing through hole, the inner fixing part is disposed at an inner side of the body and is located inside the first opening, and the inner fixing part is fixed above the first minor magnetic component.

7. The electronic device as claimed in claim 6, wherein the housing has a fixing notch, the fixing notch is located on a top of a sidewall of the housing, and one end of the outer fixing part is fixed on the fixing notch of the housing.

8. The electronic device as claimed in claim 6, wherein the body of the minor magnetic conductive component has a vent located around the first opening, and the vent is connected to the first opening.

9. The electronic device as claimed in claim 1, further comprising a major magnetic conductive component disposed on the first major magnetic component and the second magnetic module.

10. The electronic device as claimed in claim 1 wherein the supporting plate has a major body part and a plurality of connecting parts disposed on a peripheral side of the major body part, and the plurality of connecting parts are fixed on an inner wall of the housing, respectively, and the major body part has a second opening corresponding to the motor coil and located above the motor coil.

11. The electronic device as claimed in claim 1, wherein the vibration module comprises a diaphragm and a middle adhesive sheet, the bracket module is disposed on a peripheral side of the diaphragm, and the diaphragm is disposed on a peripheral side of the middle adhesive sheet, the voice coil is disposed under the middle adhesive sheet and is located inside the diaphragm.

12. The electronic device as claimed in claim 1, further comprising two elastic modules disposed on two sides of the counterweight base, and two ends of each of the two elastic components contact the housing and the counterweight base.

13. The electronic device as claimed in claim 12, wherein each elastic module comprises an elastic component and a damping sheet, two ends of the elastic component contact the housing and the counterweight base, and the damping sheet is disposed between the two ends of the elastic component.

* * * * *